(12) United States Patent
Oosaki

(10) Patent No.: US 8,482,789 B2
(45) Date of Patent: Jul. 9, 2013

(54) IMAGE READING APPARATUS AND IMAGE READING CONTROL METHOD FOR PERFORMING PRE-SCANNING PROCESS BEFORE READING PROCESS

(75) Inventor: Masayoshi Oosaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 701 days.

(21) Appl. No.: 12/710,716

(22) Filed: Feb. 23, 2010

(65) Prior Publication Data

US 2010/0214573 A1 Aug. 26, 2010

(30) Foreign Application Priority Data

Feb. 25, 2009 (JP) ................. 2009-042492

(51) Int. Cl.
*G06K 15/02* (2006.01)
(52) U.S. Cl.
USPC ............ 358/1.2; 358/449; 358/488; 358/474; 358/505; 358/1.13; 358/1.1; 358/1.16; 399/376; 399/387; 399/70; 399/365; 399/389; 399/371; 271/3.15; 271/270; 271/4.1

(58) Field of Classification Search
None
See application file for complete search history.

(56) References Cited

U.S. PATENT DOCUMENTS

| | | | |
|---|---|---|---|
| 6,206,359 B1 * | 3/2001 | Hirota et al. | 271/3.15 |
| 7,161,706 B2 * | 1/2007 | Levin et al. | 358/1.2 |
| 7,684,093 B2 | 3/2010 | Shiokawa et al. | |
| 8,059,314 B2 * | 11/2011 | Ishido | 358/474 |

(Continued)

FOREIGN PATENT DOCUMENTS

| | | |
|---|---|---|
| CN | 1442997 A | 9/2003 |
| CN | 1619430 A | 5/2005 |

(Continued)

OTHER PUBLICATIONS

Sugihara, Machine translation of Japanese Patent Appl. No. 2008-244650, published on Oct. 9, 2008.*

(Continued)

*Primary Examiner* — Benny Q Tieu
*Assistant Examiner* — Paul F Payer
(74) *Attorney, Agent, or Firm* — Baker Botts L.L.P.

(57) ABSTRACT

An image reading apparatus includes a feeder, a first reading unit, a first memory which stores image data of the surface of the document read by the first reading unit, a second reading unit located at an upstream side of the first reading position, a second memory which stores image data of the document read by the second reading unit and a controller configured to control the feeder, the first reading unit and the second reading unit. The controller controls to execute pre-scanning the document by the second reading unit over a predetermined range shorter than a separation distance between the first reading position and the second reading position in a transporting direction from a leading edge of the document when the document reaches the second reading position. The controller further controls to execute storing obtained pre-scanned image data into the second memory and measuring the size of the document based on the pre-scanned image data stored in the second memory. The controller still further controls to execute reading the surface of the document by the first reading unit when the document reaches the first reading position, and storing obtained first image data into the first memory. The controller controls to execute processing the first image data stored in the first memory based on the size of the document obtained in the measuring.

9 Claims, 3 Drawing Sheets

U.S. PATENT DOCUMENTS

| | | |
|---|---|---|
| 2002/0196457 A1 | 12/2002 | Nunokawa |
| 2004/0004742 A1 | 1/2004 | Ooshima et al. |
| 2004/0257601 A1* | 12/2004 | Tomiyasu et al. ............. 358/1.9 |
| 2005/0129436 A1 | 6/2005 | Kohchi et al. |
| 2005/0191100 A1 | 9/2005 | Ooshima et al. |
| 2008/0062449 A1* | 3/2008 | Shimura ....................... 358/1.13 |
| 2008/0199052 A1 | 8/2008 | Okamoto et al. |

FOREIGN PATENT DOCUMENTS

| | | |
|---|---|---|
| CN | 101246348 A | 8/2008 |
| EP | 1761027 A1 | 3/2007 |
| JP | H05-72854 A | 3/1993 |
| JP | H08-174968 A | 7/1996 |
| JP | HE11-065128 A | 3/1999 |
| JP | HE11-136444 A | 5/1999 |
| JP | 2000-349980 A | 12/2000 |
| JP | 2001-002279 A | 1/2001 |
| JP | 2001-127952 A | 5/2001 |
| JP | 2003-001876 A | 1/2003 |
| JP | 2008-244650 A | 10/2008 |

OTHER PUBLICATIONS

State Intellectual Property Office of the People's Republic of China, Search Report for Chinese Patent Application No. 201010126170.6 (counterpart Chinese patent application), mailed Jul. 4, 2012.

European Patent Office, European Search Report for European Patent Application No. 10250312.5, dated Dec. 5, 2011.

Japan Patent Office, Notice of Reasons for Rejection for Patent Application No. JP 2009-042492, mailed Dec. 21, 2010.

* cited by examiner

IMAGE READING APPARATUS AND IMAGE READING CONTROL METHOD FOR PERFORMING PRE-SCANNING PROCESS BEFORE READING PROCESS

CROSS REFERENCE TO RELATED APPLICATION

The present application claims priority from Japanese Patent Application No. 2009-042492, filed on Feb. 25, 2009, the disclosure of which is incorporated herein by reference in its entirely.

BACKGROUND

1. Technical Field

The present invention relates to an image reading apparatus and an image reading control method.

2. Related Art

Some of image reading apparatuses such as a scanner, a copying machine automatically detect the size of a reading target document to be transported (i.e., document size). According to a first example of an image reading apparatus, the length of a document is determined by detecting a time period for which the document being transported passes over a sensor, and the document size is determined based on the determined length of the document. According to a second example of an image reading apparatus, the width of a document is specified based on whether a sensor disposed at a specific position in the width direction of the document is turned on or not, thereby determining the document size.

In the first example, in order to recognize the document size, it is required to transport a document by a long distance, and thus the apparatus grows in size. Furthermore, in the second example, the recognizable document size is dependent on the position of the sensor, and the number of recognizable document sizes is dependent on the number of sensors and thus limited.

SUMMARY

A need has arisen to provide an image reading apparatus and an image reading control method that enable detection of various sizes of a sheet and is convenient for users without increasing the size of the apparatus.

According to an embodiment of the present invention, an image reading apparatus comprises a feeder which transports a document and a first reading unit which reads a surface of the document transported in a transporting direction by the feeder. The first reading unit is configured to read the surface of the document in a main scan direction at a first reading position. The image reading apparatus further comprises a first memory which stores image data of the surface of the document read by the first reading unit. The image reading apparatus still further comprises a second reading unit which reads one surface of the document in the main scan direction at a second reading position located at an upstream side of the first reading position with respect to the transporting direction by a predetermined distance. The image reading apparatus further comprises a second memory which stores image data of the document read by the second reading unit. Moreover, the image reading apparatus comprises a controller configured to control the feeder, the first reading unit and the second reading unit. The controller controls to execute pre-scanning the document by the second reading unit over a predetermined range shorter than a separation distance between the first reading position and the second reading position in a transporting direction from a leading edge of the document when the document transported by the feeder reaches the second reading position. The controller further controls to execute storing obtained pre-scanned image data into the second memory and measuring the size of the document based on the pre-scanned image data stored in the second memory. The controller still further controls to execute reading the surface of the document by the first reading unit with a predetermined reading resolution when the document transported by the feeder reaches the first reading position, and storing obtained first image data into the first memory. Moreover, the controller controls to execute processing the first image data stored in the first memory based on the size of the document obtained in the measuring.

According to an embodiment of the present invention, an image reading control method for an image reading apparatus is provided. The image reading apparatus includes a feeder which transports a document, a first memory, and a second memory. The image reading apparatus further includes a first reading unit which reads the surface of the document in a main scan direction at a first reading position. The image reading apparatus still further includes a second reading unit which reads one surface of the document in the main scan direction at a second reading position located at an upstream side of the first reading position with respect to the transporting direction by a predetermined distance. The image reading control method comprises a step of pre-scanning the document by the second reading unit over a predetermined range shorter than the separation distance between the first reading position and the second reading position in a transporting direction from a leading edge of the document when the document transported by the feeder reaches the second reading position. The image reading control method further comprises a step of storing obtained pre-scanned image data into the second memory. The image reading control method still further comprises a step of measuring a size of the document based on the pre-scanned image data stored in the second memory. Moreover, the image reading control method comprises a step of reading the surface of the document by the first reading unit with a predetermined reading resolution when the document transported by the feeder reaches the first reading position. The image reading control method further comprises a step of storing obtained first image data into the first memory and a step of processing the first image data stored in the first memory based on the size of the document obtained in the step of measuring.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein.

DETAILED DESCRIPTION OF THE PREFERRED EMBODIMENT

Embodiments of the invention and their features and advantages may be understood by referring to FIGS. 1A-3, like numerals being used for like corresponding parts in the various drawings. In the description given below, an entire configuration of a color printer as an example of an image forming apparatus in brief first, and then characteristic portions of the invention will be described in detail.

Figure 1A:
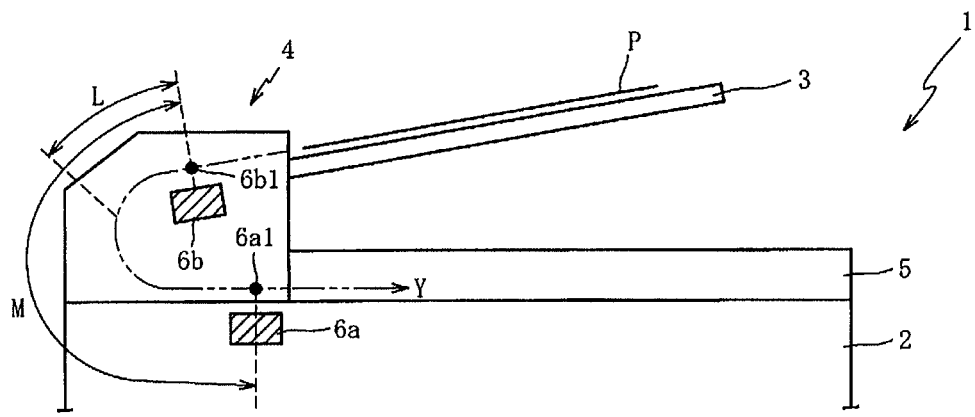
FIG. 1A is a schematic diagram showing the main construction of a multifunction machine (composite machine) according to an embodiment of the present invention.

A preferred embodiment according to the present invention will be described. FIG. 1A is a schematic diagram showing the main construction of a multifunction machine (composite machine) 1 according to an embodiment of the present invention. The multifunction machine 1 is an apparatus which singly has plural functions such as a print function, a copy function, a scanner function, and constitutes an image reading apparatus.

As shown in FIG. 1A, the composite machine 1 is configured to contain a document mount table 2 functioning as a part of a flat bed scanner, and a document cover 5 that serves as a cover for covering the document mount table 2 and has a paper supply tray 3, a paper discharge tray (not shown) and an auto document feeder (ADF) 4 for transporting a document P from the paper supply tray 3 through a paper transporting passage (not shown) to the paper discharge tray.

Furthermore, the multifunction machine 1 has a first reading unit 6a disposed along a main scanning direction below a reading glass (not shown) disposed on the upper surface of the document mount table 2. The first reading unit 6a comprises a contact image sensor (CIS) and a light source such as LED. With this first reading unit 6a, a reading face of the document P which is disposed behind the reading glass so as to be viewable through the reading glass is irradiated with light from the light source, and reflected light from the reading face is received by CIS to read the reading face of the document P line by line.

The first reading unit 6a is configured to be reciprocable in an auxiliary scanning direction. When the reading face of the document P is read while the document P is mounted on the document mount table 2, the reading face of the document P viewed through the reading glass is read out line by line while the first reading unit 6a is moved in the auxiliary scan direction (the Y direction of an arrow). When ADF reading is executed by using ADF 4, the first reading unit 6a is located at a predetermined position at which it can read the document P, and successively reads the reading face of the document P viewed through the reading glass line by line while the document P is transported by ADF 4.

Furthermore, the multifunction machine 1 has a second reading unit 6b having the same construction as the first reading unit 6a. As shown in FIG. 1A, the second reading unit 6b is fixedly disposed at a position which corresponds to an upstream side position of the transporting passage (not shown) with respect to the first reading unit 6a and at which the second reading unit 6b can read the opposite face of the document P to the reading face to be read by the first reading unit 6a. As shown in FIG. 1A, the distance at which paper is transported from a reading position 6b1 based on the second reading unit 6b to a reading position 6a1 based on the first reading unit 6a (this distance is hereinafter referred to as "inter-reading-unit distance") is represented by M.

Since the reading unit 6a and the reading unit 6b are provided along the transporting passage, the multifunction machine 1 can read both the sides of the document P at a time while the document P is transported by ADF 4. In this specification and claims, the reading face of the document P to be read out by the first reading unit 6a is referred to as "front surface", and the reading face of the document P to be read out by the second reading unit 6b is referred to as "back surface".

As described in detail later, according to the multifunction machine 1 of this embodiment, when only the front surface of the document P is read out by the first reading unit 6a while the document P is transported by ADF 4 (hereinafter referred to as "ADF one-side reading"), by using the second reading unit 6b, the document P is read over a range from the leading edge of the document P in the auxiliary scanning direction to a position which is far away from the leading edge by a distance L (for example, 30 mm) shorter than the length in the auxiliary scanning direction of the document P (in this embodiment, the longitudinal width of the document P), thereby detecting the size of the document P.

The multifunction machine 1 has a printer unit 16 (see FIG. 1B) which can perform printing on a printing sheet and an operation panel 17 which can input an instruction to the multifunction machine 1 (FIG. 1B), etc. In FIG. 1A, some of these constituent elements are omitted from the illustration in order to make the understanding of the present invention easy.

Figure 1B:
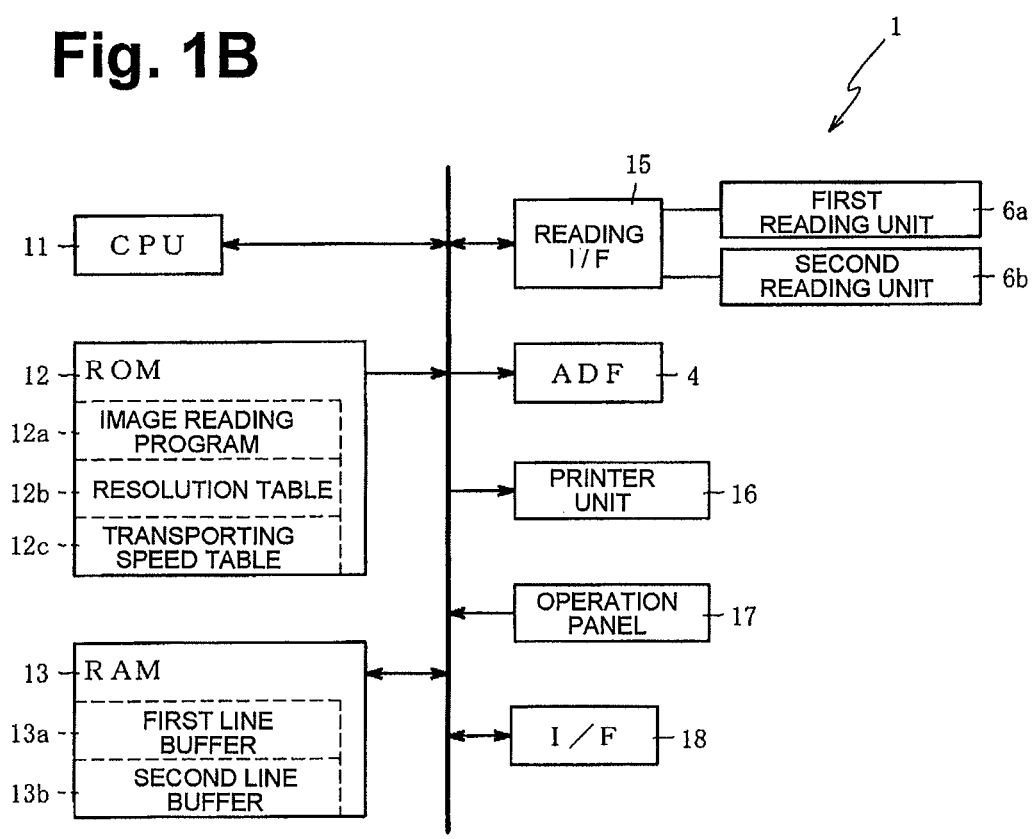
FIG. 1B is a block diagram showing the construction of an electric circuit.

FIG. 1B is a block diagram showing the electrical construction of the multifunction machine 1. As shown in FIG. 1B, the multifunction machine 1 has CPU 11 for controlling the overall operation of the multifunction machine 1, ROM 12 for storing various kinds of control programs executed by CPU 11 and fixed-value data, RAM 13 for temporarily storing data, etc. required for various kinds of processing to be executed by CPU 12, a reading interface (reading I/F) 15, the first reading unit 6a, the second reading unit 6b, ADF 4, the printer unit 16, an operation panel 17 comprising an operating unit and a display unit such as LCD, and I/F 18 as an interface for enabling connection to an external device such as a personal computer.

CPU 11, ROM 12, RAM 13, the reading I/F 15, ADF 4, the printer unit 16, the operation panel 17 and I/F 18 are mutually connected to one another through a bus line, and the first reading unit 6a and the second reading unit 6b are connected to the reading I/F 15. Based on an instruction input from the operating unit on the operation panel 17, the multifunction machine 1 executes a predetermined operation based on the input instruction. Furthermore, the multifunction machine 1 also operates based on an instruction transmitted through a corresponding driver from an external device connected through I/F 18.

ROM 12 has an image reading program 12a as an image reading program which executes image reading processing (see FIG. 3) described later, a resolution table 12b and a transporting speed table 12c. The tables 12b and 12c will be described later with reference to FIGS. 2A and 2B.

RAM 13 has a first line buffer 13a and a second line buffer 13b. The first line buffer 13a is a buffer for storing reading image data for detecting the document size, and the second line buffer 13b is a buffer for storing reading image data which are read and obtained by the first reading unit 6a.

Figure 2A:
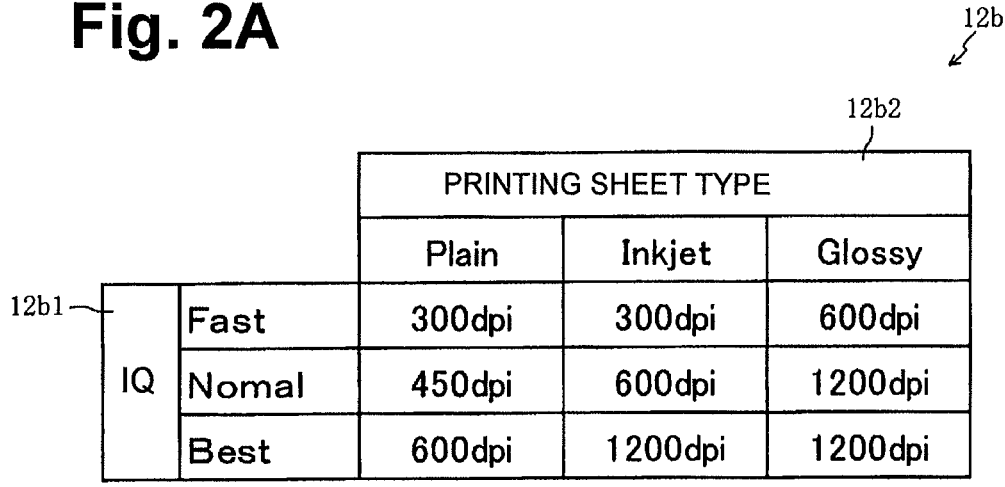
FIG. 2A is a schematic diagram showing the content of a resolution table.

Next, the resolution table 12b and the transporting speed table 12c will be described with reference to FIGS. 2A and 2B. FIG. 2A is a schematic diagram showing the content of the resolution table 12b, and FIG. 2B is a schematic diagram showing the content of the transporting speed table.

As shown in FIG. 2A, the resolution table 12b is a table for associating print image quality (image quality 12b1) when an image of the document P is printed (printed) by using the copy function in the printer unit 16, the type of printing sheet to be used for printing (printing sheet type 12b2) and a reading resolution when the surface of the document P is read out by the first reading unit 6a in an ADF one-side reading operation (hereinafter referred to as "main scan") with one another. In the example of FIG. 2A, each reading resolution under the main scan is associated with each of combinations of three types of image quality 12b1 ("Fast", "Normal", "Best"), three types of printing sheet type ("Plain", "Inkjet", "Glossy").

When a user inputs desired print image quality and printing sheet type through an operation of the operating unit on the operation panel 17 and an operation of an external device connected through I/F 18 to use the copy function, the reading resolution used under the main scan is determined based on these two input values and the resolution table 12b. For example, when the user inputs (requests) "Normal" as the image quality 12b1 and also inputs (requests) "Plain" as the printing sheet type 12b2, "450 dpi" is determined as the reading resolution used under the main scan based on the resolution table 12b.

Figure 2B:
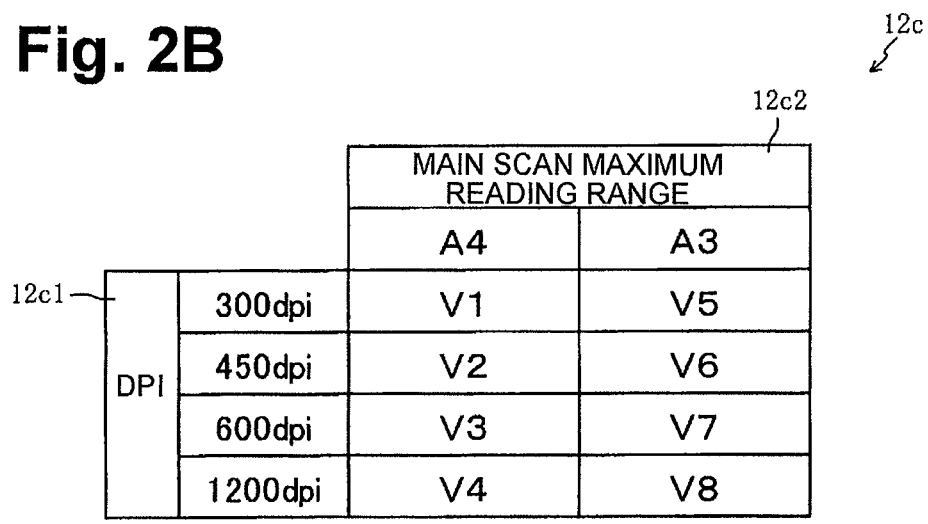
FIG. 2B is a schematic diagram showing the content of a transporting speed table.

A shown in FIG. 2B, the transporting speed table 12c is a table for associating the reading resolution under the main scan (resolution 12c1), a main scan maximum reading range (main scan maximum reading range 12c1) as a maximum reading range in the main scan direction and a transporting speed of the document P with one another. In the example of FIG. 2B, transporting speeds from V1 to V8 are respectively associated with respective combinations of four types of resolutions 12c1 ("300 dpi", "450 dpi", "600 dpi", "1200 dpi") and two types of main scan maximum reading ranges 12c2 ("A4", "A3").

The resolution 12c1 is set to a reading resolution which is input (requested) through an operation of the operating unit on the operation panel 17 or an operation of the external device connected through I/F 18 when the user uses the scan function. Alternatively, the resolution 12c1 is set to a reading resolution obtained from the resolution table 12b when the user uses the copy function.

The main scan maximum reading range 12c2 is set to a value specified through an operation of the operating unit on the operation panel 17 or an operation of the external device connected through I/F 18 when the user uses the scanner function or the copy function. The user inputs a proper size equal to or larger than the actual size of the document P (for example, "A4" in the case of B5 size) as the main scan maximum reading range.

When the resolution 12c1 and the main scan maximum reading range 12c2 are input, the transporting speed of the document P is determined based on these input values and the transporting speed table 12c. For example, "600 dpi" is input as the resolution 12c1, and "A3" is input as the main scan maximum reading range 12c2, "V7" is determined as the transporting speed based on the transporting speed table 12c.

In this embodiment, each value of the transporting speeds V1 to V8 determined based on the transporting speed table 12c is set in consideration of the separation distance M between the reading units and the time required for the processing of detecting the document size after an image for detection is read by the second reading unit 6b in the ADF one-side reading operation (hereinafter referred to "prescan") so that the document size detecting processing is finished until the main scan is started (that is, before the leading edge of the document P reaches the reading position 6a1 of the first reading unit 6a).

That is, the transporting speed determined based on the resolution 12c1 and the main scan maximum reading range 12c2 by the transporting speed table 12c is set to a value smaller than a value obtained by dividing the separation distance M between the reading units by the time from the start of the pre-scan of the second reading unit 6b till the end of the document size detection processing. In other words, the transporting speed determined by the transporting speed table 12c is equal to a value smaller than a value obtained by an equation {(the separation distance M between the reading units—the distance L)/the time taken until the end of the document size detection processing}.

As a comparison result for the same main scan reading range 12c2, the time taken until the document size detection processing is completed is longer as the value of the resolution 12c1 is larger, and thus it is necessary to reduce the transporting speed. Accordingly, the transporting speed is set so as to satisfy V1>V2>V3>V4, and V5>V6>V7>V8. On the other hand, as a comparison result for the same resolution 12b1, the time taken until the document size detection processing is completed is longer as the value of the main scan maximum reading range 12c2 is larger, and thus it is necessary to reduce the transporting speed. Accordingly, the transporting speed is set so as to satisfy V1>V5, V2>V6, V3>V7 and V4>V8.

As described above, according to the multifunction machine 1, the transporting speed is determined in accordance with the resolution 12c1 (reading resolution) and the main scan maximum reading range 12c2 in the ADF one-side reading mode, so that the document size detection processing is finished until the main scan is started. Accordingly, the main scan based on the first reading unit 6a may be started without stopping the transporting of the document P after pre-scan, and thus as compared with the case where the transporting of the document P is stopped after pre-scan, the time required until the main scan of the document P is finished (that is, the time required for all the steps from the start of the transporting of the document P till the end of the main scan) may be shortened.

As the transporting speed determined based on the transporting speed table 12c is closer to the value of {(the separation distance M between the reading units—the distance L)/the time taken until the document size detection processing is finished}, the position of the leading edge of the document P at the timing that the document size detection processing is finished is closer to the reading position 6a1 of the first reading unit 6a, and the main scan can be started at an earlier timing after the document size detection processing is finished.

Figure 3:
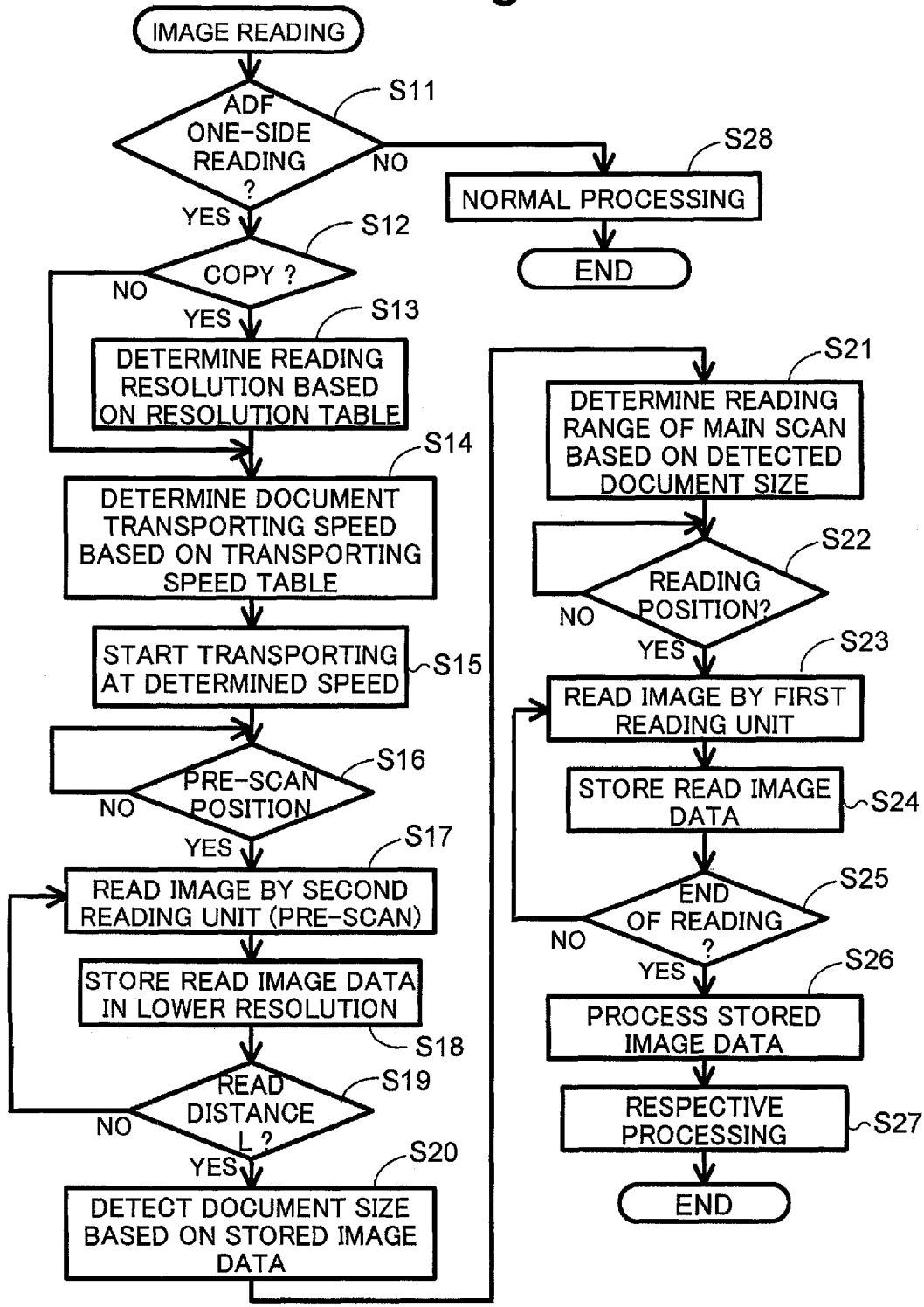
FIG. 3 is a flowchart showing image reading processing.

Next, the image reading apparatus executed by the multifunction machine 1 according to this embodiment having the above construction will be described. FIG. 3 is a flowchart showing the image reading processing executed by CPU 11. The processing shown in FIG. 3 is executed based on the image reading program 12a stored in ROM 12.

The image reading processing is started when any one of a copy instruction and a scan instruction is input by an operation to the operating unit on the operation panel 17 or an operation to the external device connected through I/F 18. First, it is checked whether the document P is read in the ADF one-side reading mode or not (S11). Here, when the document P is read in a mode other than the ADF one-side reading mode (S11: NO), normal processing of executing copy or scan in accordance with a setting is executed (S28), and the image reading processing is finished.

On the other hand, when it is checked in the processing of S11 that the document P is read in the ADF one-side reading mode (S11: YES), it is checked whether the input instruction is a "copy" instruction or not (S12). When the input instruction is the "copy" instruction (S12: YES), the reading resolution under the main scan is determined based on the print image quality and the printing sheet type required by the user by using the resolution table 12b (S13), and then the processing proceeds to the processing of S14. When it is checked in the processing of S12 that the instruction is a "scan" instruction (S12: NO), the processing of S13 is skipped, and the processing proceeds to the processing of S14.

In S14, the transporting speed of the document P is determined based on the reading resolution under the main scan and the main scan maximum reading range specified by the user by using the transporting speed table 12c (S14). At this time, the reading resolution under the main scan corresponds to the value determined through the processing of S12 when the image reading processing is executed based on the copy instruction as a trigger, or it corresponds to the reading resolution required by the user when the image reading processing is executed based on the scan instruction as a trigger.

Subsequently, the transporting of the document P is started at the determined transporting speed (S15), and it is checked whether the leading edge of the document P reaches the reading position 6b1 of the second reading unit 6b (hereinafter referred to as "back surface reading position") (S16). Here, when the leading edge of the document P does not reach the back surface reading position (S16: NO), the processing returns to the processing of S16.

On the other hand, when the leading edge of the document P reaches the back surface reading position (S16: YES), one-line image reading based on the second reading unit 6b is executed as pre-scan in the main scan maximum reading range specified by the user (S17). At this time, the document P is read at the reading resolution determined through the processing of S12 (when the copy function is used) or the reading resolution required by the user (when the scan function is used). The read image data are reduced in resolution, and then stored in the first line buffer 13a (S18).

After the processing of S18, it is checked whether the reading over the distance L (see FIG. 1A) shorter than the length of the document P in the auxiliary scan direction (in this embodiment, the longitudinal width of the document P) is finished or not (S19). When the reading over the distance L has not yet been finished (S19: NO), the processing returns to S17 to read the next one line of the document P and store the thus-obtained image data into the first line buffer 13a.

When the reading over the distance L of the document P is finished (S19: YES), the document size detection processing is executed by using the image data stored in the first line buffer 13a (S20). In this document size detection processing, an edge extraction image is created from the image data stored in the first line buffer 13a, the dimension of one side of the document P (in this embodiment, the short-side width) is determined from the edge extraction image, and the document size is detected based on the dimension of the document size stored in a predetermined area of ROM 12. An inclination of the document P with respect to the main scan direction (auxiliary operation direction) can be detected by the document size detecting processing.

After the document size detection processing (S20) is executed, the reading range in the main scan direction under the main scan is determined based on the processing result of the document size detection processing (S21), and it is checked whether the leading edge of the document P reaches the reading position 6a1 of the first reading unit 6a (hereinafter referred to as "front surface reading position") (S22). Here, when the leading edge of the document P does not reach the front surface reading position (S22: NO), the processing returns to the processing of S22.

On the other hand, when the leading edge of the document P reaches the front surface reading position (S22: YES), the image reading of one line by the first reading unit 6a is executed in the reading range of the main scan direction determined through the processing of S21 (S23). The reading resolution at this time also corresponds to the reading resolution determined through the processing of S12 (when the copy function is used) or the reading resolution required by the user (when the scan function is used) as in the case of the pre-scan.

After the processing of S23, the read-out image data are stored in the second line buffer 13b (S24), and it is checked whether the reading of the document P is finished, that is, the trailing end of the document P in the auxiliary scan direction reaches the front surface reading position (the reading position 61a) (S25). At this time, when the reading of the document P has not yet been finished (S25: NO), the processing returns to the next one line to read the next one line and store the thus-obtained image data into the second line buffer 13b.

On the other hand, when the reading of the document P is finished (S25: YES), the image data stored in the second line buffer 13b is processed based on the processing result of the document size detection processing of S20 (S26). In the processing of S26, based on the processing result of the document size detection processing, an image is rotated as occasion demands, and then cut out in the main scan direction in accordance with the detected document size. The image data obtained through the processing of S26 are stored in a predetermined area of RAM 13.

After the processing of S26, each processing is executed according to "copy" or "scan" (S27). Specifically, when the copy function is used, the image data obtained through the processing of S26 (the image data stored in RAM 13 after the processing) are converted to print data having print image quality requested by the user, and then printed by the printer unit 16. On the other hand, when the scan function is used, a file of the image data stored in the RAM 13 through the processing of S26 is created, and stored in RAM 13 or an external device connected through I/F 18. After the processing of S27, the image reading processing is finished.

As described above, according to the multifunction machine 1 of this embodiment, the second reading unit 6b for reading the back surface of the document P is provided at the upstream side of the first reading unit 6a for reading the surface of the document P with respect to the transporting passage, and the pre-scan to detect the document size is executed by using the second reading unit 6b when the ADF one-side reading is executed. Therefore, the transporting time (moving time) of the document P from the end of the pre-scan till start of the main scan of the first reading unit 6a can be applied to the execution period of the document size detection processing. Therefore, the time required till the main scan of the document P is finished can be shortened by only the transporting time concerned.

Particularly, according to the multifunction machine 1 of this embodiment, the transporting speed is determined in accordance with the image reading resolution conformed with the user's requirement for the print image quality, the printing sheet type and the reading resolution so that the document size detection processing is finished until the main scan is started. Therefore, the main scan of the first reading unit 6a can be started without stopping the transporting of the document P after the pre-scan. Accordingly, as compared with the case where the transporting of the document P is stopped after the pre-scan, the time required until the main scan of the document P is finished can be shortened.

Furthermore, the determined transporting speed is also continuously used as a transporting speed under the main scan which is executed after the document size detection processing. Accordingly, since the transporting of the document P is not stopped from the start of the transporting till the end of the transporting, an acceleration which necessarily occurs at the re-start time of the transporting when the transporting is temporarily stopped does not occur during the main scan, and thus the read image of the next one line can be prevented from offsetting in the auxiliary scan direction due to the above acceleration at the re-start time of the transporting. Therefore, degradation of the image quality may be prevented or reduced, and an image having high image quality may be obtained. Furthermore, the main scan can be executed while the document P is transported at a fixed speed, so that the degradation of the image quality due to the acceleration during the main scan may be prevented or reduced.

According to the multifunction machine 1 of this embodiment, the transporting speed is determined by using the transporting speed table 12c based on the reading resolution conformed with the user's requirement for the print image quality, the printing sheet type and the reading resolution, and thus the optimum transporting speed may be readily determined. Furthermore, when the copy function following print of a read image is used, the reading resolution for referring to the transporting speed table 12c is determined based on the user's requirement for the print image quality and the printing sheet type by using the resolution table 12b, so that the optimum print image is obtained and also the transporting speed can be readily determined so that the time required until the main scan of the document P is finished can be optimized.

Furthermore, according to the multifunction machine 1 of this embodiment, the reading range in the main scan direction under the main scan is determined based on the processing result of the document size detection processing. Accordingly, the reading range in the main scan direction under the main scan can be set to the equal to or less than the main scan maximum reading range used under the pre-scan. As the reading range in the main scan direction under the main scan is smaller, the size of the read image data is smaller, so that the power consumption amount of the memory is reduced and the processing load of CPU 11 may be reduced.

According to the multifunction machine 1 of this embodiment, the document size is detected by using the second reading unit 6b for reading the back surface side of the document P when the ADF one-side reading is executed. Therefore, the document detection processing can be finished without providing any reading unit for detecting the document size before the main scan is started, thereby suppressing increase of the manufacturing cost.

The present invention has been described based on the above embodiment, however, the present invention is not limited to the above embodiment. It can be readily inferred that various modifications and alterations can be made within the subject matter of the present invention.

For example, in the above embodiment, the document size under the ADF one-side reading is detected by using the second reading unit 6b for reading the back surface side of the document P. However, a reading unit which is exclusively used to detect the document size may be provided at an upstream side of the first reading unit 6a with respect to the transporting passage. The reading unit dedicated for detecting the document size may read the front surface of the document P or the back surface of the document P.

Furthermore, in the above embodiment, the resolution table 12b is configured as a table for associating a resolution table 12b with the print image quality (image quality 12b1), the printing sheet type (printing sheet type 12b2) and the reading resolution under the main scan, however, it may be configured as a table for associating the print image quality or the printing sheet type and the reading resolution under the main scan with each other. That is, the reading resolution under the main scan may be determined not based on both the print image quality and the printing sheet type, but based on any one parameter thereof.

In the above embodiment, the transporting speed which is smaller than the value {(the separation distance M between the reading units—the distance L)/the time taken until the document size detection processing is finished} determined by using the transporting speed table 12c in accordance with the reading resolution conformed with the user's request is used from the start time of the transporting of the document P. However, this transporting speed may be applied at least after the pre-scan of the second reading unit 6b is completed. For example, the transporting speed under the pre-scan of the second reading unit 6b is set to be higher than the transporting speed determined by using the transporting speed table 12c, whereby the time required until the main scan of the document P is finished may be more greatly shortened.

Furthermore, in the above embodiment, the first line buffer 13a for storing the reading image data based on the pre-scan and the second line buffer 13b for storing the reading image data based on the main scan are provided. However, these line buffers may be configured to be common to each other so that the reading image data based on the pre-scan are first stored and then the reading image data based on the main scan are overwritten on the former reading image data.

Still furthermore, in the above embodiment, the reading resolution under the pre-scan is also set as the reading resolution under the main scan, and the image data read by the second reading unit 6b are stored in the first line buffer 13a while the resolution of the image data concerned is lowered. However, the document may be read with the low resolution applied under the pre-scan, and the obtained image data may be stored into the first line buffer 13a.

Still furthermore, in the above embodiment, the multifunction machine 1 is applied as the image reading apparatus. However, a scanner having ADF in which a reading unit for reading the back surface of a document is disposed at an upstream side of a reading unit for reading the surface of the document with respect to the transporting passage may be an image reading apparatus.

Moreover, in the above embodiment, the transporting path of the document is formed in U-shape as shown in FIG. 1A. However, the shape of the transporting path of the document may be modified variously. For example, a straight transporting path of the document may be applicable.

What is claimed is:
1. An image reading apparatus comprising:
a feeder which transports a document;
a first reading unit which reads a surface of the document transported in a transporting direction by the feeder, the first reading unit being configured to read the surface of the document in a main scan direction at a first reading position;
a first memory which stores image data of the surface of the document read by the first reading unit;
a second reading unit which reads one surface of the document in the main scan direction at a second reading position located at an upstream side of the first reading position with respect to the transporting direction by a predetermined distance;
a second memory which stores image data of the document read by the second reading unit; and
a controller configured to control the feeder, the first reading unit and the second reading unit to execute:
pre-scanning the document by the second reading unit over a predetermined range shorter than a separation distance between the first reading position and the second reading position in a transporting direction from a leading edge of the document when the document transported by the feeder reaches the second reading position;
storing obtained pre-scanned image data into the second memory;

measuring the size of the document based on the pre-scanned image data stored in the second memory;

reading the surface of the document by the first reading unit with a predetermined reading resolution when the document transported by the feeder reaches the first reading position;

setting a transporting speed of the document based on a transporting speed table, such that a time for transporting the document from the end of the predetermined range to the first reading position is greater than a processing time for measuring the size of the document;

storing obtained first image data into the first memory; and processing the first image data stored in the first memory based on the size of the document obtained in the measuring.

2. The image reading apparatus according to claim 1, wherein the one surface of the document read by the second reading unit is different from the surface of the document read by the first reading unit.

3. The image reading apparatus according to claim 1, wherein the controller controls the transporting speed such that the transporting speed of the document after an end position of the pre-scan is set to be equal to a reading speed at which the first reading unit reads the surface of the document in an auxiliary scan direction.

4. The image reading apparatus according to claim 3, further comprising:

a print unit that prints an image on a printing medium with printing image quality corresponding to the obtained first image data;

a third memory which stores, in association with at least one of printing image quality and the type of the printing medium, the transporting speed after the end position of the pre-scan;

a request value input unit that inputs at least one request value of the type of the printing medium, wherein the controller determines the transporting speed after the end position of the pre-scan based on the transporting speed table stored in the third memory and the request value input by the request input unit, and transports the document at the determined transporting speed.

5. The image reading apparatus according to claim 1, wherein the first reading unit is configured to move in an auxiliary scan direction.

6. An image reading apparatus comprising:

a feeder which transports a document;

a first reading unit which reads a surface of the document transported in a transporting direction by the feeder, the first reading unit being configured to read the surface of the document in a main scan direction at a first reading position;

a first memory which stores image data of the surface of the document read by the first reading unit;

a second reading unit which reads one surface of the document in the main scan direction at a second reading position located at an upstream side of the first reading position with respect to the transporting direction by a predetermined distance;

a second memory which stores image data of the document read by the second reading unit;

an U-turn transporting passage through which the document transported by the feeder passes, wherein the second reading unit is disposed inside the U-turn transporting passage; and a controller configured to control the feeder, the first reading unit and the second reading unit to execute:

pre-scanning the document by the second reading unit over a predetermined range shorter than a separation distance between the first reading position and the second reading position in a transporting direction from a leading edge of the document when the document transported by the feeder reaches the second reading position;

storing obtained pre-scanned image data into the second memory;

measuring the size of the document based on the pre-scanned image data stored in the second memory;

reading the surface of the document by the first reading unit with a predetermined reading resolution when the document transported by the feeder reaches the first reading position;

storing obtained first image data into the first memory; and processing the first image data stored in the first memory based on the size of the document obtained in the measuring.

7. The image reading apparatus according to claim 6, wherein the first reading unit is located below the second reading unit.

8. The image reading apparatus according to claim 6, wherein the controller controls the feeder such that the document is transported without any stoppage from start of the pre-scan by the second reading unit till start of reading the surface of the document by the first reading unit.

9. An image reading control method for an image reading apparatus including a feeder which transports a document, a first memory, a second memory, a first reading unit which reads the surface of the document in a main scan direction at a first reading position, and a second reading unit which reads one surface of the document in the main scan direction at a second reading position located at an upstream side of the first reading position with respect to a transporting direction by a predetermined distance, the image reading control method comprising steps of:

pre-scanning the document by the second reading unit over a predetermined range shorter than the separation distance between the first reading position and the second reading position in a transporting direction from a leading edge of the document when the document transported by the feeder reaches the second reading position;

storing obtained pre-scanned image data into the second memory;

measuring a size of the document based on the pre-scanned image data stored in the second memory;

reading the surface of the document by the first reading unit with a predetermined reading resolution when the document transported by the feeder reaches the first reading position;

setting a transporting speed of the document based on a transporting speed table, such that a time for transporting the document from the end of the predetermined range to the first reading position is greater than a processing time for measuring the size of the document;

storing obtained first image data into the first memory; and processing the first image data stored in the first memory based on the size of the document obtained in the step of measuring.

* * * * *